(12) United States Patent
Sinha et al.

(10) Patent No.: US 8,595,708 B2
(45) Date of Patent: Nov. 26, 2013

(54) SYSTEMS AND METHODS FOR CONCURRENCY ANALYSIS

(75) Inventors: Nishant Sinha, Plainsboro, NJ (US); Chao Wang, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 225 days.

(21) Appl. No.: 13/109,998

(22) Filed: May 18, 2011

(65) Prior Publication Data

US 2012/0011492 A1     Jan. 12, 2012

Related U.S. Application Data

(60) Provisional application No. 61/362,087, filed on Jul. 7, 2010, provisional application No. 61/431,133, filed on Jan. 10, 2011.

(51) Int. Cl.
| | |
|---|---|
| *G06F 11/00* | (2006.01) |
| *G06F 3/048* | (2013.01) |
| *G06F 9/44* | (2006.01) |
| *G06F 9/45* | (2006.01) |
| *G06F 9/46* | (2006.01) |
| *G01N 33/50* | (2006.01) |

(52) U.S. Cl.
USPC ............. 717/132; 714/20; 715/706; 717/107; 717/109; 717/126; 717/149; 702/19; 718/100

(58) Field of Classification Search
None
See application file for complete search history.

(56) References Cited

U.S. PATENT DOCUMENTS

| | | | | |
|---|---|---|---|---|
| 5,860,009 | A * | 1/1999 | Uchihira et al. | 717/149 |
| 6,975,976 | B1 * | 12/2005 | Casavant et al. | 716/136 |
| 7,941,616 | B2 * | 5/2011 | Rajamani et al. | 711/152 |
| 2001/0020293 | A1 * | 9/2001 | Uchihira et al. | 717/4 |
| 2005/0010907 | A1 * | 1/2005 | Namjoshi | 717/124 |
| 2005/0196809 | A1 * | 9/2005 | Kelleher | 702/19 |
| 2005/0246682 | A1 * | 11/2005 | Hines | 717/109 |
| 2006/0282807 | A1 * | 12/2006 | Ivancic et al. | 716/5 |
| 2006/0294499 | A1 * | 12/2006 | Shim | 717/107 |
| 2007/0168988 | A1 * | 7/2007 | Eisner et al. | 717/126 |
| 2008/0289045 | A1 * | 11/2008 | Fryer | 726/26 |
| 2008/0307258 | A1 * | 12/2008 | Challenger et al. | 714/20 |
| 2009/0193416 | A1 * | 7/2009 | Kahlon | 718/100 |
| 2009/0327889 | A1 * | 12/2009 | Jeong et al. | 715/706 |
| 2010/0299656 | A1 * | 11/2010 | Shah et al. | 717/132 |

OTHER PUBLICATIONS

Matthew B. Dwyer et al., Data Flow Analysis for Verifying Properties of Concurrent Programs, 1994, [Retrieved on Jul. 8, 2013]. Retrieved from the internet: <URL: http://dl.acm.org/citation.cfm?id=195295> 14 Pages (69-75).*

(Continued)

*Primary Examiner* — Don Wong
*Assistant Examiner* — Anibal Rivera
(74) *Attorney, Agent, or Firm* — Joseph Kolodka; Bao Tran

(57) ABSTRACT

Systems and methods are disclosed to check properties of bounded concurrent programs by encoding concurrent control flow graph (CFG) and property for programming threads as a first-order formula F1; initializing an interference abstraction (IA); encoding the IA as a first-order formula F2; checking a conjunction of F1 and F2 (F1^F2); if the conjunction is satisfiable, checking if an interference relation (IR) is spurious, and iteratively refining the IA; and if the conjunction is unsatisfiable, checking if an interference relation (IR) is spurious, and iteratively refining the IA.

20 Claims, 5 Drawing Sheets

(56) References Cited

OTHER PUBLICATIONS

Jia Zeng et al., Generating Fast Code from Concurrent Program Dependence Graphs, 2004, [Retrieved on Jul. 8, 2013]. Retrieved from the internet: <URL: http://dl.acm.org/citation.cfm?id=997188> 7 Pages (175-181).*

Chao Wang, Sudipta Kundu, Malay Ganai, Aarti Gupta: Symbolic Predictive Analysis of Concurrent Programs, C. Wang, S. Kundu, M. Ganai, and A. Gupta. In FM 2009.

Chao Wang, Swarat Chaudhuri, Aarti Gupta, and Yu Yang: Symbolic Pruning of Concurrent Program Executions, in FSE 2009.

Nishant Sinha, Chao Wang: Staged Concurrent Program Analysis, in FSE 2010.

Orna Grumberg, Flavio Lerda, Ofer Strichman, Michael Theobald: Proof-guided underapproximation-widening for multi-process systems. POPL 2005.

Cormac Flanagan, Shaz Qadeer: Thread-Modular Model Checking. *SPIN 2003*: Thomas A. Henzinger, Ranjit Jhala, Rupak Majumdar, Shaz Qadeer: Thread-Modular Abstraction Refinement. CAV 2003.

Ariel Cohen, Kedar S. Namjoshi: Local proofs for global safety properties. *Formal Methods in System Design* 34(2): 104-125 (2009).

K. Rustan M. Leino, Madan Musuvathi, Xinming Ou: A Two-Tier Technique for Supporting Quantifiers in a Lazily Proof-Explicating Theorem Prover. TACAS 2005.

* cited by examiner

SYSTEMS AND METHODS FOR CONCURRENCY ANALYSIS

The present application claims priority to U.S. Provisional Application Ser. Nos. 61/362,087, filed Jul. 7, 2010 and 61/431,133 filed Jan. 10, 2011, the contents of which are incorporated by reference.

BACKGROUND

The present application relates to checking properties of bounded concurrent programs using a staged data-centric analysis.

Analyzing shared memory concurrent programs is difficult due to the fact that constituent program threads may interfere with each other via shared variables. Multiple formalisms have been developed to model and reason about interference, e.g., the Mazurkiewicz traces model the program behaviors as a partial order over events while the context-switching model utilizes a scheduler to generate all possible thread interleavings. Because analyzing all possible interferences is intractable in practice, these models employ reduction techniques to focus on a subset of interferences, e.g., partial-order reduction or context-bounding. Both M-traces and context-switching are control-centric formalisms, i.e., data flow among concurrent threads is induced by enforcing causal orders between concurrent events directly or by explicitly switching control between threads.

Recent approaches have employed a different approach for verification based on memory consistency (MC) models, which prescribe rules on which write a read may observe in a valid program execution. An MC model is data-centric, i.e., the causal order between concurrent events is determined based on the data flow from writes to reads. The MC formalism is attractive for program verification because it allows reasoning about concurrent read-write interference directly while retaining the partial orders among events. The most well-known and intuitive model is that of sequential consistency (SC), where all concurrent threads observe the same global order of events and each read observes the most recent write. In spite of the ubiquitous presence of SC in concurrent program analysis, the logical foundations of SC have received little attention besides, where various MC models are formalized in higher-order logic uniformly.

FIG. 1 shows a prior art system to check properties of concurrent programs. The system of FIG. 1 encodes the individual threads of the concurrent control flow graph and the property of the program as formula F1 (10). The encoding includes the existence of potential bugs as part of the property. Next the system encodes the interactions between program threads (interference) as formula F2 (12). The system checks to see if the conjunction between formulas F1 and F2 (F1^F2) is satisfied (14). In 16, if yes, the system provides a witness to enable a user to recreate the bug or problem. Alternatively, if there is no bug, the system generates the proof that the program is correct and bug-free.

Even with the system of FIG. 1, checking properties of bounded concurrent C programs automatically using symbolic methods is difficult due to large number of possible interleavings of concurrent programs that the analysis must explore.

SUMMARY

Systems and methods are disclosed to check properties of bounded concurrent programs by encoding concurrent control flow graph (CFG) and property for programming threads as a first-order formula F1; initializing an interference abstraction (IA); encoding the IA as a first-order formula F2; checking a conjunction of F1 and F2 (F1^F2); if the conjunction is satisfiable, checking if an interference relation (IR) is spurious, and iteratively refining the IA; and if the conjunction is unsatisfiable, checking if an interference relation (IR) is spurious, and iteratively refining the IA.

Advantages of the preferred embodiments may include one or more of the following. The system can determine small property-preserving abstractions which allow more scalable verification. In contrast to relaxed memory consistency models developed for improving execution performance, the system's abstractions are targeted to proving programs correct or finding bugs efficiently. By modeling the SC axioms as a two-player logical game, called the interference game. The game-view serves as a basis for defining interference abstractions for the formalism (analogous to partial-order reduction and context-bounding for Mazurkiewicz traces and context-switching formalisms, resp.) and enables scalable verification. The system provides a framework of game abstractions based on player moves. Besides exposing the potential abstractions more clearly, the framework supports improved methods for solving logic games that arise from concurrency.

DETAILED DESCRIPTION

Figure 1:
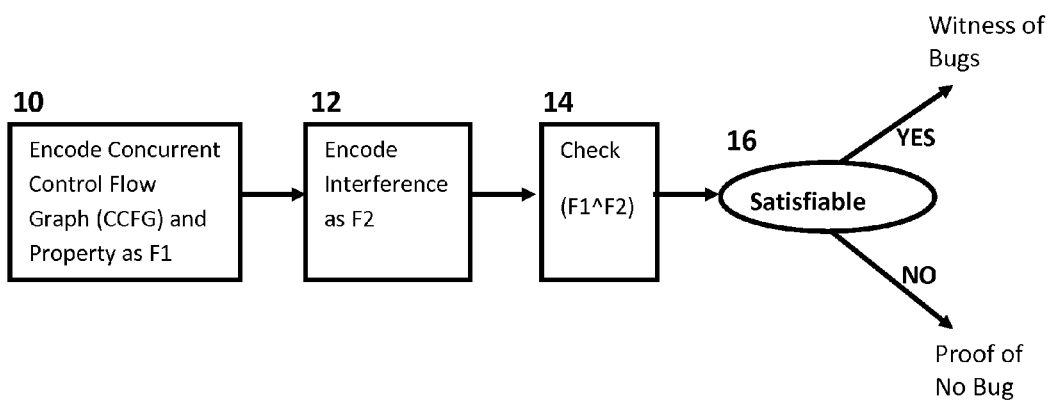
FIG. 1 shows a prior art system to check properties of concurrent programs.
Figure 2:
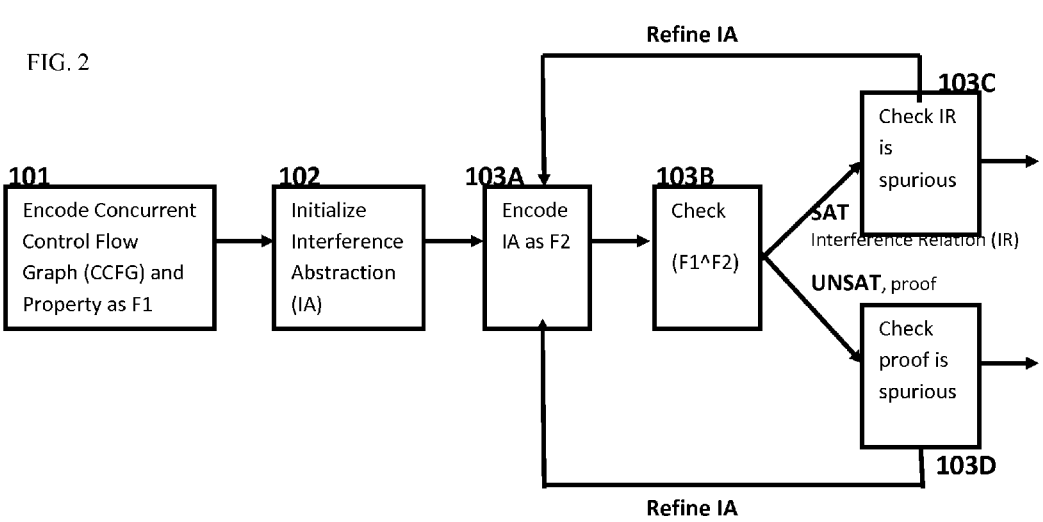
FIG. 2 shows an exemplary system to check properties of bounded concurrent programs.

FIG. 2 shows an exemplary system to check properties of bounded concurrent programs. Similar to FIG. 1, the system encodes the individual threads of the concurrent control flow graph and the property of the program as formula F1 (101). Next, the system initializes an Interference Abstraction (IA) (102), which is an abstraction of the interactions between program threads.

Given a concurrent shared memory-based program with a set of global read and write accesses made by constituent threads, the IA is defined by "de-coupling" one or more reads from the writes that may interfere with the read. More specifically, an IA may (i) not couple a read with any write (ii) force a read to be coupled with a limited number of writes (iii) couple a read with a write but ignore the data flow and ordering constraints between them or (iv) allow an interfering write to execute between a coupled read and write. The IA does not correspond only to an over-approximation of the set of possible behaviors; it may under-approximate the behaviors or contain a combination of over- and under-approximations. The IAs can be obtained syntactically from the axioms of sequential consistency (SC). These axioms specify rules on how the global read and writes may be linked correctly: an IA corresponds to a violation of one or more of those rules and can be obtained by instantiating the SC axioms in a restricted manner. In one embodiment, the IA can be initialized by assuming that there is no interference among the program threads. However, other initialization assumptions can be made as well.

The system of FIG. 2 encodes the IA as formula F2 (103A). Next the system checks the conjunctive condition where F1^F2 (103B). If the condition can be satisfied (SAT), it means there is a "potential" witness to enable a user to recreate the bug or problem. This "potential" witness, which can be represented as an interference relation (IR), may not be real. The system checks if the IR is spurious (103C). If not spurious, the system provides a real witness to enable a user to recreate the bug or problem. If the condition (103B) cannot be satisfied (UNSAT), it means there is a "potential" proof that the program is correct or bug-free. The system checks if the proof is spurious (103D). If not spurious, the system provides a real proof that the program indeed is correct or bug-free. From 103C or 103D, In case the witness or proof is spurious, the IA is refined and the system loops back to 103A to encode IA as F2.

The system of FIG. 2 works by abstracting the interference between concurrent threads in form of an Interference Abstraction (IA) and then makes the IA sufficiently precise to check properties using systematic iterative refinement. In this manner, the IA is incrementally refined until the system reaches a point that satisfies the user that the program behavior is correct.

The abstraction in FIG. 2 is different from previously known approximation methods for concurrent programs, including those based on restricting scheduler choices, or using predicates or numerical abstract domains (e.g., polyhedra), abstraction of the state space/transition relation of individual processes or abstraction due to context-bounding. Moreover, it cannot be captured directly using any of the above abstraction methodologies.

A more general formulation of IAs is obtained by viewing the SC axioms as a two-player logical game between a Refuter and a Verifier. In this view, the IAs correspond to reducing the possible moves of the either player to obtain a smaller game (a) which is easier to solve and (b) a winning strategy in the smaller game for the either player can be extended to the original game.

Based on the axiomatic formulation of SC in first-order logic, SC can be viewed from a logical perspective along two directions: (a) the logical models of SC and their equivalence classes, and (b) the abstractions of SC. The equivalence classes correlate program executions and are therefore useful for enumerative/dynamic exploration methods. The abstractions, intuitively, relax or strengthen the SC axioms and thus allow more scalable verification (analogous to partial-order reduction methods for M-traces and context-bounding for the context-switching formalism). In contrast to weak memory consistency models developed for improving execution performance, these abstractions are targeted at proving programs correct or finding bugs efficiently.

The logical models of SC axioms, called interference relations (IRs), utilize two main primitives: (a) the observer function $O$, which maps each read to the write it observes, and (b) the happens-before relation (HB), which captures the partial order between read/write events in an execution. The IRs are similar to traditional M-traces with a key difference, i.e., the $O$ function, which enables IRs to capture the data flow directly, as opposed to some form of read-write dependency in M-traces. M-traces over reads and writes can, in fact, be viewed as a particular fine-grained equivalence relation over IRs. Interestingly, these equivalences allow an uniform embedding of a variety of dynamic testing and enumerative exploration techniques.

The SC axioms is viewed as a logical game, called the interference game (IG). The SC axioms are first-order logic formula with alternating quantifiers over reads and writes and therefore correspond to a two-player logical game between the Refuter and the Verifier. Given a program and a property, the Refuter tries to show that the valid program executions do not violate the property. In contrast, the Verifier tries to find a valid execution that violates the property. The game view exposes the complexity in solving for SC executions and therefore leads to a new set of concurrency abstractions, called interference game abstractions (IGAs). An IGA is obtained by restricting the set of moves available to players in the original SC game, and is cheaper to solve than the original game. IGs are orthogonal to the earlier use of games in model checking where the game is over the control structure (e.g., the transition relation) and abstraction merges the control states. In contrast, an IG models the data-flow among concurrent components via read-write interactions and an IGA amounts to a restricted data flow among the components, which is computationally cheaper to analyze.

IGAs provide an uniform framework for finding bugs as well as proving concurrent programs correct, as opposed to under-approximations targeted at detecting bugs or over-approximations targeted at proofs. The interference games expose a new and interesting connection between concurrency and game-solving; although developed for SC, the games are also applicable to weaker MC models.

The IGAs can be determined with an SMT solver. A move-refinement process using an SMT solver can be used to verify concurrent programs. An IGA may be viewed as an selective instantiation of SC axioms according to a reduced configuration. One exemplary approach therefore starts with a reduced instantiation of Π into a quantifier-free formula, say Π'. The solver then checks Π' for satisfiability and either obtains a model (IR) or UNSAT proof, i.e., a winning strategy for E or A, respectively. The system checks if the model or the proof holds for original formula Π also, when the process terminates. This is done efficiently, by a layered instantiation of axioms to check if IR is feasible or by inspecting the proofs for reads with reduced link sets. Otherwise, the procedure iteratively instantiates SC axioms for more reads and writes (larger game configurations).

The system of FIG. 2 applies IAs for scaling up SC-based verification using SMT solvers, where IAs lacked the game-based view. The generic move-refinement process is used, which is also applicable to other logic games. To handle programs which have unbounded number of reads/writes, the system can first cluster the events into finite sets and then use move-reductions. Such clusters may be based on program location or variable groups or arbitrary predicates, in general. The formalism of IRs will be valuable in discovering more coarse equivalences effective for bug-finding tasks.

The iterative instantiation procedure (to compute a suitable IGA automatically) gives dramatic performance improvements as compared to full instantiation of SC axioms (i.e., solving the original game directly) and is able to solve much larger concurrent benchmarks. These benchmarks are beyond the reach of other symbolic methods based on partial order reduction. Further, owing to large number of possible context-switch locations in many benchmarks, symbolic context bounding techniques will also be ineffective. The inventors contemplate that clustering-based game abstractions can be used, as well as combinations of interference game abstractions with control-flow game abstractions.

In one implementation, the Interference Abstraction (IA, short for IGA) is achieved by "de-coupling" one or more reads from the writes that may interfere with the read. More specifically, an IA may (i) not couple a read with any write (ii) force a read to be coupled with a limited number of writes (iii) couple a read with a write but ignore the data flow and ordering constraints between them or (iv) allow an interfering write to execute between a coupled read and write. An IA is not just an over-approximation of the data flow between concurrent threads; it may under-approximate the data flow or contain a combination of over- and under-approximations. The sequential consistency (SC) axioms specify rules on how the global read and writes may be linked correctly: an IA corresponds to a violation of one or more of those rules and can be obtained by instantiating the SC axioms in a restricted manner. Such an abstraction is different from all previously known approximation methods for concurrent programs, including those based on restricting scheduler choices, or using predicates or numerical abstract domains (e.g., polyhedra), abstraction of the state space/transition relation of individual processes or abstraction due to context-bounding. Moreover, it cannot be captured directly using any of the above abstraction methodologies. The method works by abstracting the interference between concurrent threads in form of an Interference Abstraction (IA) and then makes the IA sufficiently precise to check properties using systematic iterative refinement.

Figure 3:
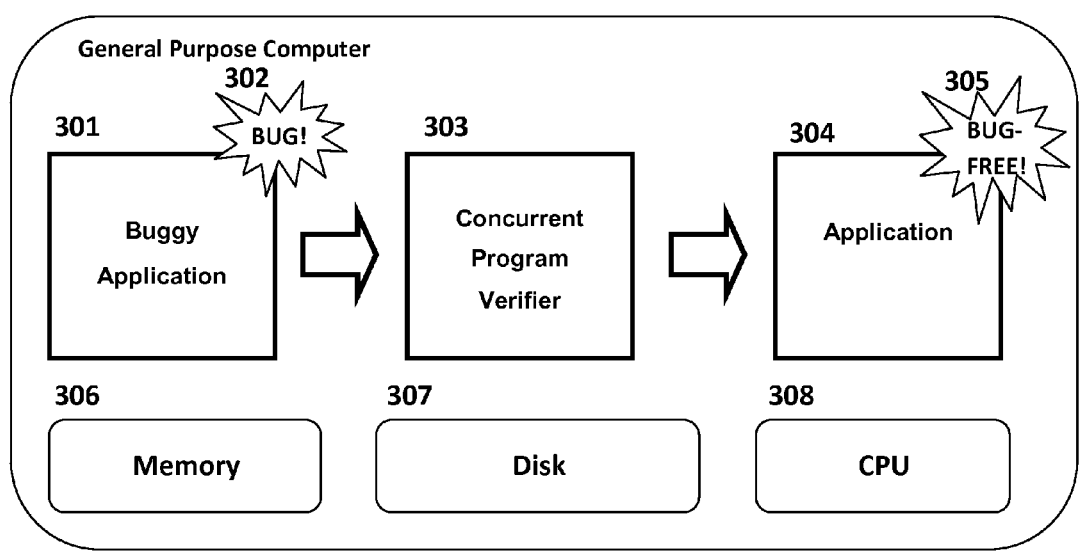
FIG. 3 shows an exemplary computer system with software that needs testing to be bug-free.
Figure 4:
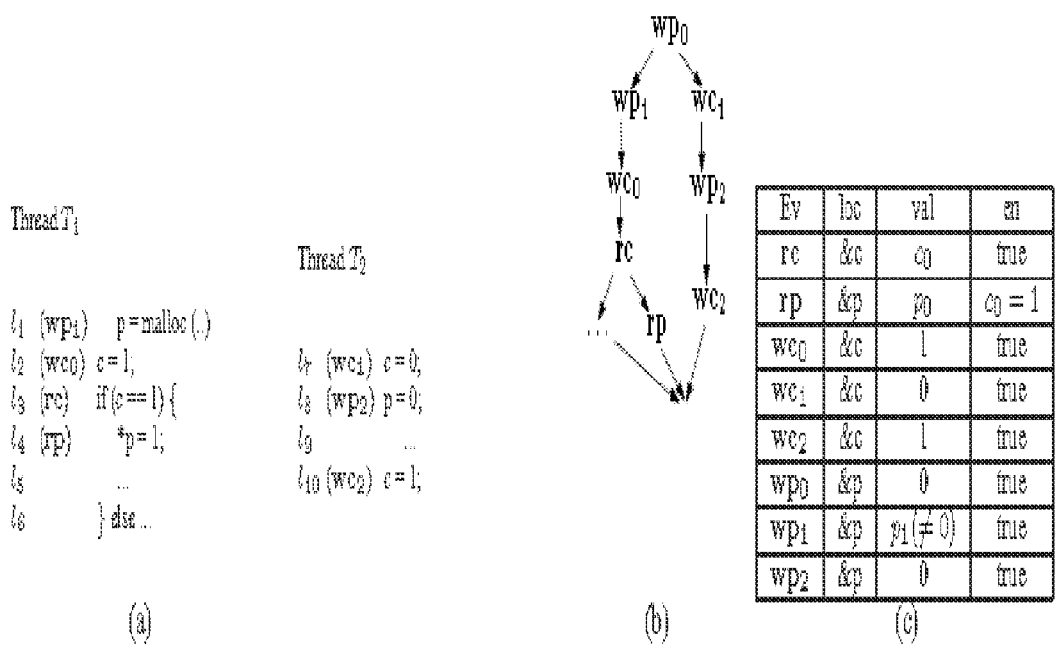
FIG. 4 shows an exemplary multi-threaded program to be analyzed.

FIG. 3 shows an exemplary computer system with software that needs testing to be bug-free. In FIG. 3, buggy software 301 that includes one or more bugs 302 is process by a concurrency program verifier 303. The result is application software 304 that is bug free. The system includes memory 306, disk 307 and processor 308. FIG. 4 thus is a generic simple architecture for generating bug-free software and that the verifier could be applied to a computer system whose functions or modules are spread across networks.

The system of FIG. 3 detects bugs in concurrent programs. A concurrent program consists of a set of threads $T_i$ (i>0), communicating via shared variables G and local variables $L_i$ for each thread. Each thread $T_i$ is modeled by a control flow graph in the standard manner. Synchronization constructs, e.g., lock/unlock, wait/notify are also modeled with shared variables. In particular, lock(A) in thread $T_i$ (i>0) translates to an atomic block {assume (A==0); A=i;} and unlock(A) in thread $T_i$ translates to {assume (A==i); A:=0}. To focus on concurrency, the following exemplary discussion will only consider programs over integer variables with a finite set of read/write accesses on these variables.

Global events record reads or writes to shared memory locations by the program. Formally, a global access event e is a tuple (loc,val,en), where loc(e) is the location, val(e) is the value and en(e) is the enabling condition for event e. The fields loc, val and en may contain symbolic values. Events $e_1$ and $e_2$ are said to conflict, denoted by confl($e_1$,$e_2$), if loc($e_1$)=loc($e_2$) and either $e_1$ or $e_2$ is a write.

A (strict) partial-order relation < over set S is an irreflexive, asymmetric and transitive relation over S×S. A linearization of < is a totally ordered relation <' such that for all $s_1,s_2 \in S$, $s_1 < s_2 \Rightarrow s_1 <' s_2$.

The interference skeleton IS(P) of a concurrent program captures the global reads and writes of a program P. Formally, IS(P)=(E,$\hat{PO}$), where E contains all global read and write events in P and $\hat{PO}$ denotes the program order, i.e., the relative order of events in E induced by the program P. IS(P) is constructed via a sequential analysis of the control flow graph of P, which creates global read and write events during exploration. To model all possible concurrent interference to each thread $T_i$, a fresh symbolic variable is assigned to val(r) for each read r in $T_i$. This effectively decouples the reads from all conflicting writes in the program. The reads are coupled with appropriate writes later via memory consistency axioms to generate feasible executions.

FIG. 4(a) shows an exemplary C program $P_1$ with two threads $T_1$ and $T_2$, which access shared variables p and c (thread creation/destruction not shown). Let p be initialized to 0 (modeled by write $wp_0$). $P_1$ has a possible NULL dereference at line $l_4$ if (p=0). Each program location accessing shared variables is labeled by its global read/write event. FIG. 4(b) shows the skeleton IS($P_1$) of $P_1$ as a partial order graph: the nodes of the graph are global events and the edges denote the program order. The table in FIG. 4(c) shows the details (loc,val,en) of each event. Note that reads rc and rp are assigned symbolic values $c_0$ and $p_0$ at $l_3$ and $l_4$ respectively (ignore the write event due to *p at $l_4$). Note how these symbolic reads influence the control flow, e.g., the event rp is enabled depending on the value $c_0$ read by rc. The partially ordered skeleton IS(P) may give rise to totally ordered traces in multiple ways. The rules of sequential consistency precisely determine which of these total orders are correct program executions.

Next, an axiomatic formulation of Sequential Consistency will be discussed. The sequential consistency (SC) rules only allow executions (a) where all the threads observe the same order of global events and (b) reads observe the most recent write in the causal order. Formally, these rules are modeled as axioms in first-order logic, with the help of the happens-before relation HB, which is a strict partial order relation and witnesses the causal order in any execution.

The may happen-between relation, Hbet($e_1$,e,$e_2$):= (en(e)∧¬HB(e,$e_1$)∧¬HB(e,$e_2$)), holds if e is enabled and may execute after $e_1$ and before $e_2$ in some program execution. The SC axioms are modeled as a logical formula Π as follows.

$$\Pi := \exists HB \cdot \Pi_0 \wedge \Pi_1$$

$$\Pi_0 := \forall e_1 \cdot \forall e_2 \cdot PO(e_1,e_2) \Rightarrow HB(e_1,e_2)$$

$$\Pi_1 := \forall r \cdot en(r) \Rightarrow \phi_1(r)$$

$$\phi_1(r) := \exists w \cdot en(w) \wedge \phi_2(r,w) \wedge \phi_3(r,w)$$

$$\phi_2(r,w) := (loc(r)=loc(w) \wedge val(r)=val(w) \wedge HB(w,r))$$

$$\phi_3(r,w) := \forall w' \cdot Hbet(w,w',r) \Rightarrow loc(w') \neq loc(w')$$

Formula Π consists of two parts $\Pi_0$ and $\Pi_1$. Formula $\Pi_0$ models that all events in the execution causal order HB follow the program order $\hat{PO}$. Formula $\Pi_1$ enforces that for each enabled read r, $\phi_1(r)$ must hold, where $\phi_1(r)$ says that there exists an enabled write w (that r observes) such that r and w are locally ($\phi_2$) and globally ($\phi_3$) consistent. Local consistency $\phi_2(r,w)$ implies that the values and locations of r and w are same and w executes before r. Global consistency $\phi_3(r,w)$ implies that if r observes w, then no other conflicting write w' must execute between w and r, i.e., w is the last write before r. Given a skeleton IS(P)=(E, $\hat{PO}$) obtained from program P, let $R \subseteq E$ be the set of reads in E and $W \subseteq E$ be the set of writes in E. In Π, the quantified variable r ranges over reads R, w and w' range over writes W, and $e_1$, $e_2$ range over E. The quantification on HB is made explicit only for clarity; Π is essentially a first-order logic formula.

The system can "Skolemize" Π by removing (∃w) (in $\phi_1$) from inside the scope of (∀r) using a special Skolem function called observer function O, which maps each read r to some write w. Π is rewritten as ($\exists HB, O \cdot \Pi_0 \wedge \Pi_1$) where $\phi_1(r)$ becomes $\phi_1(r):=en(\bigcirc(r)) \wedge \phi_2(r,\bigcirc(r)) \wedge \phi_3(r,\bigcirc(r)))$ (**)

and $\Pi_0$, $\Pi_1$, $\phi_2$ and $\phi_3$ remain the same. The observer function $\bigcirc$ is central to the discussion of any memory consistency (MC) model and determines which write a read may observe in an execution consistent with the MC model. For convenience, if $\bigcirc(r)=w$, then r links with w.

Verification problem (Safety). Given the property formula $\Phi_{PRP}$ and program skeleton IS encoded as $\Phi_{IS}$ (using loc, val, en and $\hat{PO}$ predicates), the system checks if $\Phi:=\Phi_{IS} \wedge \Phi_{PRP} \wedge \Pi$ is satisfiable. In this case, the satisfying model of $\Phi$ corresponds to an actual witness of the program P. For a finite IS, solving $\Pi$ (and hence $\Phi$) is PSPACE-complete. The system will focus primarily on checking $\Pi$:$\Pi$ is (UN)SATISFIABLE instead of $\Phi$ is (UN)SATISFIABLE.

To illustrate, the detection of the NULL dereference in program $P_1$ in FIG. 4(a) using SC-based reasoning is discussed next.

Example. In IS($P_1$), the reads are R={rc,rp} and the writes are W={$wc_0$, $wc_1$, $wc_2$, $wp_0$, $wp_1$, $wp_2$}. A NULL dereference occurs at location $l_4$ if the read rp is enabled and ($p_0=0$), i.e., $\Phi_{PRP}=(p_0=0 \wedge en(rp))$. To detect this error, the system picks (a) a HB order and (b) an observer function $\bigcirc$ on events in IS(P) which satisfy $\Pi$ and $\Phi_{PRP}$. To satisfy $\Pi_0$, the system initializes HB=$\hat{PO}$. However, to satisfy $\Pi_1$, multiple observer functions are needed.

(A) Suppose the system picks $\bigcirc(rc)=wc_1$ and $\bigcirc(rp)=wp_2$. To satisfy $\Pi$, $\phi_2(rc,wc_1)$ must hold. So, $c_0$=val(rc)=val($wc_1$)=0. Therefore, en(rp)=($c_0$=1)=false (cf. FIG. 1(c)). This violates $\Phi_{PRP}$. So, $\bigcirc$ does not lead to a feasible execution.

(B) Next, if $\bigcirc(rc)=wc_2$ and $\bigcirc(rp)=wp_0$. Because $\phi_2(rc,wc_2)$ and $\phi_2(rp,wp_0)$ hold, HB($wc_2$,rc) and HB($wp_0$,rp). However, because $\hat{PO} \subset HB$, Hbet($wp_0$,$wp_1$,rp), i.e., $wp_1$ executes between $wp_0$ and rp (cf. FIG. 1(b)). This violates $\phi_3(rp,wp_0)$, i.e., $wp_0$ is not the most recent write for rp.

(C) Finally, let $\bigcirc(rc)=wc_2$ and $\bigcirc(rp)=wp_2$. To satisfy $\phi_3(rc,wc_2)$, no write to c may happen-in-between $wc_2$ and rc. By $\Pi_0$, HB($wc_1$,$wc_2$), so $wc_1$ is ruled out. But, $wc_0$ may happen-in-between: to avoid this, the system adds the constraint ($wc_0$, $wc_2$)∈HB. Now, $\phi_3(rp,wp_2)$ also holds ($wp_1$ cannot happen-in-between) and hence $\bigcirc$ and HB satisfy $\Pi$. Any linearization of this HB yields a totally-ordered concrete execution of $P_1$ which performs the NULL dereference: in particular, $wc_0$ and $wc_1$ may be ordered arbitrarily. The example illustrates the data-centric nature of SC formalism, i.e., how the observer function dictates the causality relation. In contrast, the control-centric interleaving model will perform two context-switches (after $l_2$ and $l_{10}$) to induce the same data flow. Further, the SC formalism works with partial-ordered executions and does not linearize unless required to satisfy $\phi_3$.

The context-switching model (CSM) uses an explicit scheduler to switch the control flow among threads and hence operates under a so-called state-transfer paradigm: at each context switch, the global state is transferred to the next executing thread, thus leading to inter-thread data flow. In general, the SC-based formalism captures the data flow directly, as opposed to the CSM which uses control-flow to induce data flow indirectly. The CSM, may, therefore, lead to redundant duplication of global variables along an execution, which is avoided with the SC formalism by linking reads with writes directly. In contrast, the states in CSM capture possible correlations among writes, which is absent in the data-flow model.

The logical models of SC, called interference relations, correspond to a set of program executions and are defined as follows. An IR I is a tuple (R,W,$\bigcirc$,$\eth$) where R⊂R and W⊂W are the enabled reads and writes resp., $\overline{\bigcirc}$ is an observer function and $\eth$ is a partial order over the set R∪W. Note that I is essentially determined by its two key components, the observer function $\bigcirc$ and the happens-before relation $\eth$ ($\eth$ denotes a particular valuation of HB). In the following, an IR I is represented as (E,$\bigcirc$,$\eth$), where E=(R∪W) is the set of enabled read/write events. Rd(E) and Wr(E) denote R and W respectively. If I satisfies $\Pi$ (more precisely, I satisfies $\Phi$), then I is said to be feasible. In general, I corresponds to a partially-ordered execution of the program; however, the following lemma shows that an arbitrary linearization of I is also feasible. Therefore, a feasible I corresponds one or more actual program executions. Given a feasible IR I=(E,$\bigcirc$,$\eth$), let I' be obtained by linearizing $\eth$ arbitrarily. Then, I' is also feasible.

Checking $\Pi$ directly to obtain an IR (or infeasibility proofs) involves analyzing all possible data flows in the bounded program, which is not scalable. The system determines IRs efficiently by employing a game-based view of sequential consistency axioms. The complexity of solving $\Pi$ is better understood if viewed as a two-player game, called the interference game, between the Refuter A and the Verifier E. The Refuter A tries to prove $\Pi$ unsatisfiable for the given skeleton IS(P) of program P and property $\Phi_{PRP}$, i.e., no feasible behaviors of P violate $\Phi_{PRP}$. The Verifier, in contrast, tries to find a violating execution, i.e., an IR. The game structure for $\Pi$ may be visualized as a canonical game tree, shown in FIG. 5; each tree node corresponds to a sub-formula $\psi$ of $\Pi$ and is labeled by the top symbol of $\psi$. Player A (E) owns the nodes labeled by $\forall$ or $\wedge$ ($\exists$ or $\vee$ resp.). Intuitively, the game starts at the initial node (corresponding to $\Pi$) and proceeds by players choosing a move at the nodes they own until a leaf is reached. More formally, each tree node gives rise to multiple positions based on choices on the incoming path to the node: a position is a tuple ($\psi(x)$,v), where $\psi$ is a sub-formula of $\Pi$ with free variables x and v is an assignment for x. For example, the node marked (*) in FIG. 5 corresponds to sub-formula $\phi_1(r)$ and a different position for each chosen value of r.

At a position ($\forall x \cdot \psi'$,v), A moves to position ($\psi'$,v[x←v]) by choosing a value v for x; similarly E moves at $\exists x \cdot \psi$. At $\psi_1 \wedge \psi_2$, A chooses a conjunct, and at $\psi_1 \vee \psi_2$, E chooses a disjunct to play further. Each play of the game is a finite sequence of positions corresponding to a path in the game tree. The leaves of the tree represent the winning positions for A or E and are labeled by atomic predicates from $\Pi$. Suppose a play of the game finishes at a leaf node labeled by an atom P(x) in $\Pi$. The play is won by E (A) iff P(x) ($\neg$P(x)) holds true under the current valuation v. A strategy is a function from sequences of legal positions to moves. A strategy $\sigma$ is winning for a player if the player wins in all plays according to $\sigma$, irrespective of the other player's moves. Intuitively, finding a model (IR) for $\Pi$ is the same as computing a winning strategy for the player E in the interference game (IG). The tree for $\Pi$ can also be extended to the tree for $\Phi$ directly; hence the logical game for $\Phi$ is an extension of the game for $\Pi$.

Recall the example in FIG. 4 where a NULL dereference is feasible. Using the game-view, E has a winning strategy in IG. First, suppose E picks HB with value $\eth := \hat{PO} \cup \{(wc_2,rc), (wp_2,rp),(wc_0,wc_2)\}$. Then if A plays $\Pi_0$ E always wins by using $\eth$ for any ($e_1$, $e_2$) chosen by A. Otherwise, A plays $\Pi_1$ and then picks either rc or rp. Because both rc and rp are enabled, E must pick a write w for each read. Suppose, E picks $wc_2$ for rc and $wp_2$ for rp. Because, both $wc_2$ and $wp_2$ are enabled, A will play either $\phi_2$ or $\phi_3$. If A plays $\phi_2$, the play is always won by E because all the three leaf predicates are satisfied for both (rc,wc$_2$) and (rp,wp$_2$). Similarly, when playing φ$_3$, E is able to win for every choice of w' by A. Hence, the winning strategy for E is modeled by an IR (R,W,○,δ̂), where R={rc,rp}, W=W, ○(rc)=wc$_2$ and ○(rp)=wp$_2$, and δ̂ as defined above.

The cost of finding a winning strategy in IG increases with the number of possible plays, which, in turn, depends on the initial choice of HB and the following choices for r, w and w'. This leads to the idea of game abstractions, which have lesser plays and therefore are cheaper to solve than the original game.

Next, Interference Game Abstractions (IGAs) will be discussed. An abstract game G restricts the choices available to each player to those given by a reduced configuration. Therefore, G has fewer number of possible plays than the original game Ĝ, which, in turn, implies that G is cheaper to solve than Ĝ. For example, consider an abstract game G$_1$ for the FIG. 4 example, with W(rp)={wp$_2$} and W(rc)={wc$_1$,wc$_2$}, and the other configuration components have the default values. Now, with the reduced link set, E cannot pick wp$_0$ or wp$_1$ for rp and wc$_0$ for rc and hence has fewer choices in G$_1$ than the original game Ĝ$_1$. However, even with fewer choices, E can win G$_1$ by playing wc$_2$ for rc and wp$_2$ for rp. Also, the system may check that E wins the original game Ĝ$_1$ with the same strategy, i.e., the winning strategy in G$_1$ is persistent in Ĝ$_1$. Thus, the abstract game G$_1$ proves valuable: E can find a winning strategy in G$_1$ cheaply and then use it to win the original costlier game Ĝ$_1$.

An IGA corresponds to an approximated data flow over the reads and writes of the bounded program. An IGA over-approximates the data flow (called an Over-approximate IA) in case when moves of the A-player are reduced. Otherwise, if the moves of the E-player are reduced, then we get an under-approximate data flow (Under-approximate IA). We may also obtain a combination of over- and under-approximate data flow by reducing the moves of both the players. Such mixed approximations are useful in guiding an automated search for the correct over- or under-approximate IA.

Unfortunately, a winning strategy in the abstract game may not always extend to the original game. For example, fix W(rp)={wp$_1$}. Now A has a winning strategy in this abstract game (no NULL dereference is possible). However, E always wins the original game. In this case, A's winning strategy is spurious. In general, the system finds small abstract games G with persistent winning strategies, i.e., a winning strategy in G (for the either player) also holds for the original game Ĝ.

A owns the moves in the components R, F and PO, while E owns the moves in W. Therefore, a winning strategy for A (an infeasibility proof) in an IGA G persists in Ĝ if G allows E to make all the moves from Ŵ. Similar reasoning applies to E.

Next, an iterative move-refinement method is presented to compute IGAs with persistent winning strategies automatically. The pseudo-code for the method is as follows:

1. Pick an initial abstract game configuration C=(R$_0$,W$_0$, F$_0$,PO$_0$).
2. Solve for a winning strategy for both players E and A in G=(Π,C). If such a strategy (say, σ) exists for player E, goto 3. Else, goto 4.
3. Check if σ is winning for E in the original game Ĝ. If yes, output σ and terminate. Otherwise, augment the moves of A in C and goto 2.
4. Check if σ is winning for A in the original game Ĝ. If yes, output σ and terminate. Otherwise, augment the moves of E in C and goto 2.

The above method starts with a reduced configuration C, and iteratively solves the abstract game G for C and updates C if the winning strategy for G is not persistent in the original game. It updates C based on which player has a spurious winning strategy in the current G, by allowing more moves to the other player in the next iteration. Finally, it terminates with G having a persistent winning strategy. To be efficient, the algorithm must keep C small by adding only the relevant moves at each iteration, e.g., by only adding moves sufficient to show that the current winning strategy is spurious. Moreover, the initial choice of C is crucial for efficiency.

The move-refinement algorithm may also be viewed as starting with an initial (mixed) data flow over-approximation over the reads and writes, which is iteratively refined until an under- or over-approximate data flow configuration is found, which corresponds to a winning strategy for the E-player or the A-player respectively.

The foregoing discussion has primarily focused on IGAs obtained by reducing moves based on quantified variables in Π. A more fine-grained IGAs can be achieved by considering the moves available at each ∧ and ∨ nodes in the game tree and restricting these moves also. Our method of reducing and iteratively enlarging the moves of players is not restricted to SC games: the method can be used to efficiently solve arbitrary logic game, and, in particular, other memory consistency games also.

The interference game abstractions (IGAs) have many applications. Intuitively, a small IGA corresponds to a small set of reads and writes which are sufficient to detect errors or prove their absence. Many concurrent safety errors, e.g., data races, deadlocks and atomicity violations, typically occur due to a small amount of unexpected interference between threads. This fact is captured formally by IGAs, i.e., there often exist small IGAs sufficient to detect these errors in a computationally efficient manner.

Figure 5:
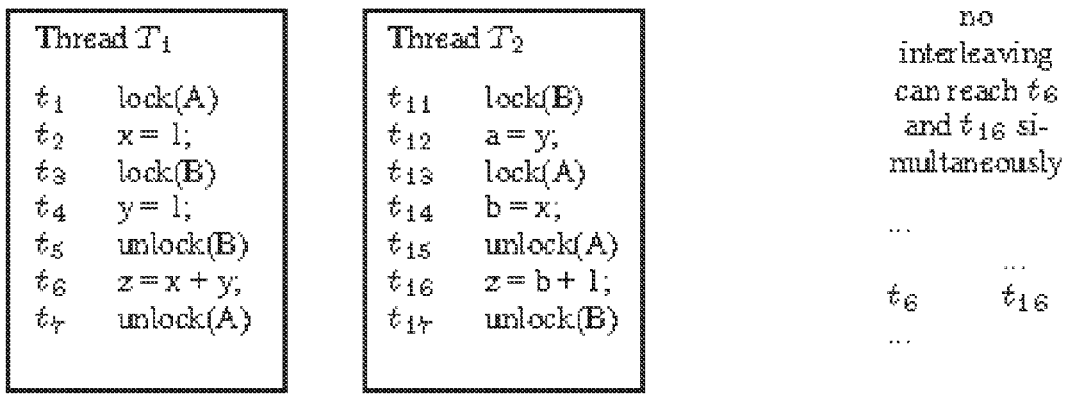
FIG. 5 shows two threads $T_1$ and $T_2$ of a program with shared variables x, y, z and locks A and B.

Control-guided Reachability. For checking many concurrent properties, e.g., absence of data races, it is sufficient to examine the interaction between the synchronization primitives only, while disregarding other data flow. Instances of such reasoning include methods based on locksets and control-state reachability analysis. FIG. 5 shows two threads T$_1$ and T$_2$ of a program with shared variables x,y,z and locks A and B. If a software tester wants to check for a data race between locations t$_6$ and t$_{16}$ the system can show the absence of race using only lock semantics for locks A and B. The system models lock and unlock statements in terms of reads and writes on lock variables A and B. In this example, R$_v$ (W$_v$) denote the reads (writes) on variable v. The property Φ$_{PRP}$ is that statements t$_6$ and t$_{16}$ are not causally ordered in some execution. The original interference game Ĝ has configuration C=(R,Ŵ,F̂,P̂O), where the refuting set R=(R$_A$∪R$_B$∪R$_x$∪R$_y$∪R$_z$), and the other components are defined in the standard manner, i.e., suppose Ŵ and F̂ contain all conflicting writes for each read. In that case, A always wins in Ĝ. For example, if E links the read of lock(A) at t$_1$ with the initial lock write (A:=0), then E can only link the read of lock(A) at t$_{13}$ with unlock(A) at t$_7$ (otherwise A will always win). However, now t$_6$ and t$_{16}$ are ordered and so E loses. But solving Ĝ is costly because it involves redundant plays on reads/writes of x, y and z. To show the absence of race, it is sufficient to solve an abstract game G' with configuration C'=(R$_A$∪R$_B$,Ŵ,F̂, P̂O) having a reduced refuting set. A always wins in G'. Moreover, because no moves of E are restricted in C', the winning strategy of A carries over to Ĝ also. The idea of field abstraction can similarly be modeled by removing reads on irrelevant fields from the refuting set R.

Figure 6:
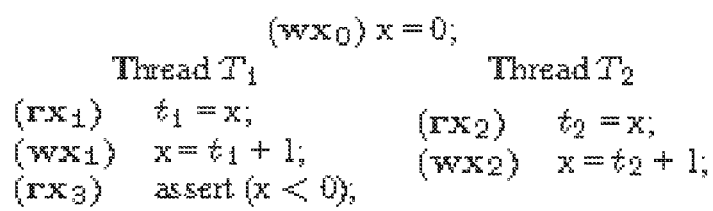
FIG. 6 shows the detection of an exemplary assertion failure in a serial execution of two threads.

Serial or Largely Executions. Many concurrent errors appear in executions where threads execute serially one after another or with interleaving sporadically. FIG. 6 shows a simple program where the violation of assertion (x<0) can be detected without considering any concurrent interference. This is captured by an abstract game with reduced E-moves, where each read is restricted to observe only the preceding intra-thread write or the initial write, i.e., $W(rx_1)=W(rx_2)=\{wx_0\}$ and $W(rx_3)=\{wx_1\}$, with $HB:=\hat{PO} \cup \{(rx_3, wx_2)\}$. The reduced initial set of moves are sufficient for E to obtain a winning strategy. Further, by adding all moves of A, e.g., $\hat{F}(rx_1,wx_0),\hat{F}(rx_2,wx_0)$, etc., the system can check that the strategy is preserved in the original game.

In contrast, the NULL-dereference in the program in FIG. 4 cannot be detected with an initial game configuration of the above form. More precisely, consider the initial configuration where $R=\{rp,rc\}$, $W(rp)=\{wp_1\}$, $W(rc)=\{wc_0\}$, $\forall r,w \cdot \hat{F}(r,w)=\emptyset$ and $PO=\hat{PO}$. Clearly, A wins in this configuration. The iterative move refinement process can be used now: the reason why A's strategy may be spurious is because rp is forced to link with $wp_1$. Therefore, the next iteration updates moves of E by adding $wp_2$ to $W(rp)$. Now, E is able to win with $HB=\hat{PO}$, $O(rp)=wp_2$ and $O(rc)=wc_0$. Next, if A's moves are updated by adding $wc_1$ and $wc_2$ to $F(rc,wc_0)$; now, E cannot win with the previous strategy. However, E can win with a new strategy where $HB=\hat{PO} \cup \{(wc_1,wc_0),(rc,wc_2)\}$. Finally, by adding all the other F-moves of A, the system can check that this winning strategy is persistent. This configuration is still reduced because the read rc is restricted to observe $wc_0$ only. Many concurrent bugs manifest in such largely serial executions where most reads observe intra-thread writes, and hence are captured by IGAs with small link sets W.

The IGAs provide a uniform framework for finding both bugs and proofs. This is because the game-view treats both the players symmetrically, allowing simultaneous search for winning strategies for both the players. The system can determine small property-preserving abstractions which allow more scalable verification.

The move-refinement procedure presented above can be implemented using an SMT solver using a procedure REF which iteratively checks and instantiates Π axioms for more reads and writes. At a particular step, REF checks the current instantiation of Π with the program to obtain an IR or an unsatisfiability proof. If an IR is obtained, REF checks if it is spurious by adding all the moves of the E-player for the IR, i.e., all the corresponding sub-formula. Otherwise, if a proof is obtained, REF checks if the proof persists even after adding all the sub-formula moves of the A-player. This naïve refinement strategy may not converge quickly to a desirable small IA on its own. In particular, it may add redundant constraints guided by the model (IR) from the solver, thus making the intermediate IA larger and the subsequent iterations more expensive. A set of heuristics can be used to focus the refinement on relevant constraints.

Static Focusing

One set of heuristics can guide REF by removing redundant constraints or adding useful lemmas statically.

(O1) Interference Pruning. For each read r, compute a small $\widetilde{W}(r)$, not containing any writes that r may never link with. For example, a r cannot link with w if $HB(r,w)$ holds statically, or if $HB(w,r)$ and there exist interfering writes w' along each path from w to r. Such writes may be detected by performing a static analysis on the interference skeleton (1S).

(O2) Biased Initialization. To obtain IAs with lesser concurrent interference, we initialize W(r) for each r with only writes in the same thread or initial writes. This ensures that if a serial or largely serial execution (cf. Sec. 5.3) violates the property, then few refinement iterations will be sufficient. We also bias the initial IA to couple reads and writes on synchronization variables only. This forces REF to start with only those IAs where the above interference conditions must hold.

(O3) Lock Lemmas. A number of optimizations are possible for locks. Thus if L denotes the set of matching lock/unlock statements in the whole program and the accesses to the lock variable for each $L_i \in L$ be $(r_i, w_i, w'_i)$. For each $L_1, L_2 \in L$, either the statement block denoted by $L_1$ executes before the block denoted by $L_2$ or vice-versa. This fact can be captured by the constraints $\forall i \cdot \forall j \cdot (HB(w'_i,r_j) \vee HB(w'_j,r_i))$, which are quadratic in the size of L (better than the original cubic size).

(O4) Layered Instantiation. To check if an IR is spurious, the REF procedure first instantiates $\phi_2(r,w)$ axioms followed by $\phi_3(r,w)$ axioms for the reads/writes in the IR. This allows spurious IRs to be discarded using the cheaper $\phi_2(r,w)$ axioms as opposed to the costlier $\phi_3(r,w)$ axioms.

The above system may be implemented in hardware, firmware or software, or a combination of the three. Preferably the system is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method having a processor to check properties of bounded concurrent programs, comprising:
   encoding concurrent control flow graph (CFG) and property for programming threads as a first-order formula F1;
   initializing an interference abstraction (IA) by de-coupling one or more reads from the writes that may interfere with the read from a set of rules including: not coupling a read with any write; forcing a read to be coupled with a limited number of writes; coupling a read with a write but ignore data flow and ordering constraints; or allowing an interfering write to execute between a coupled read and write, wherein the IA corresponds to a violation of one or more of the rules and obtained by instantiating sequential consistency (SC) axioms;
   encoding the IA as a first-order formula F2;
   checking a conjunction of F1 and F2 (F1^F2);
   if the conjunction is satisfiable, checking if an interference relation (IR) is spurious, and iteratively refining the IA; and
   if the conjunction is unsatisfiable, checking if the proof is spurious, and iteratively refining the IA.

2. The method of claim 1, wherein the property comprises one or more bugs.

3. The method of claim 1, comprising obtaining IAs syntactically from axioms of sequential consistency by reducing the moves of the existential and universal players.

4. The method of claim 3, comprising performing biased initialization of the IA.

5. The method of claim 1, comprising checking the property using IA with iterative refinement.

6. The method of claim 1, comprising checking if (F1^F2) is satisfiable or has a proof.

7. The method of claim 1, comprising checking if the satisfying interference relation (IR) is spurious.

8. The method of claim 1, comprising checking a spurious IR by layered instantiation of SC axioms.

9. The method of claim 1, comprising checking if an infeasibility proof is spurious.

10. The method of claim 1, comprising performing interference pruning for focusing of iterative refinement.

11. The method of claim 1, comprising using lock lemmas for focusing of iterative refinement.

12. The method of claim 1, comprising:
   picking an initial abstract game configuration $C=(R_0, W_0, F_0, PO_0)$;
   solving for a winning strategy for both players E and A in $G=(\Pi, C)$;
   checking if $\sigma$ is winning for E in an original game $\hat{G}$ and if so output $\sigma$ and terminate and otherwise, augment the moves of A in C; and
   checking if $\sigma$ is winning for A in the original game $\hat{G}$ and if so output $\sigma$ and terminate and otherwise, augment the moves of E in C.

13. A system having a processor to check properties of bounded concurrent programs, comprising:
   means for encoding concurrent control flow graph (CFG) and property for programming threads as a first-order formula F1;
   means for initializing an interference abstraction (IA) by de-coupling one or more reads from the writes that may interfere with the read from a set of rules including: not coupling a read with any write; forcing a read to be coupled with a limited number of writes; coupling a read with a write but ignore data flow and ordering constraints; or allowing an interfering write to execute between a coupled read and write, wherein the IA corresponds to a violation of one or more of the rules and obtained by instantiating sequential consistency (SC) axioms;
   means for encoding the IA as a first-order formula F2;
   means for checking a conjunction of F1 and F2 (F1^F2);
   means for checking if an interference relation (IR) is spurious, and iteratively refining the IA if the conjunction is satisfiable; and
   means for checking if the proof is spurious, and iteratively refining the IA if the conjunction is unsatisfiable.

14. The system of claim 13, wherein the property comprises one or more bugs.

15. The system of claim 13, comprising means for obtaining IAs syntactically from axioms of sequential consistency by reducing the moves of the existential and universal players.

16. The system of claim 15, comprising means for performing biased initialization of the IA.

17. The system of claim 13, comprising means for checking the property using IA with iterative refinement.

18. The system of claim 13, comprising means for checking if (F1^F2) is satisfiable or has a proof.

19. The system of claim 13, comprising means for checking if the satisfying interference relation (IR) is spurious.

20. The system of claim 13, comprising means for checking a spurious IR by layered instantiation of SC axioms; means for checking if an infeasibility proof is spurious; means for performing interference pruning for focusing of iterative refinement and means for using lock lemmas for focusing of iterative refinement.

* * * * *